(No Model.) 2 Sheets—Sheet 1.
J. E. DANN & J. LAPP.
TELEPHONE TRANSMITTER.
No. 347,924. Patented Aug. 24, 1886.
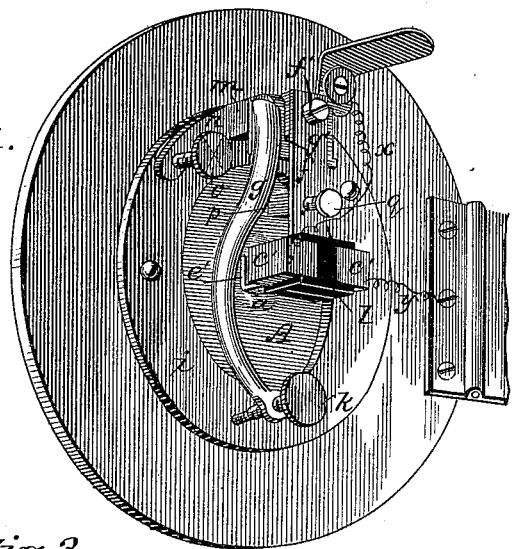
Fig. 1.
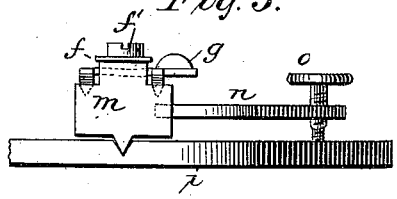
Fig. 3.
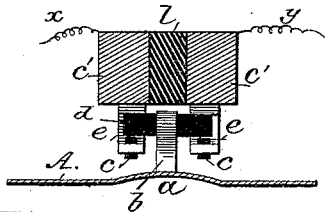
Fig. 4.
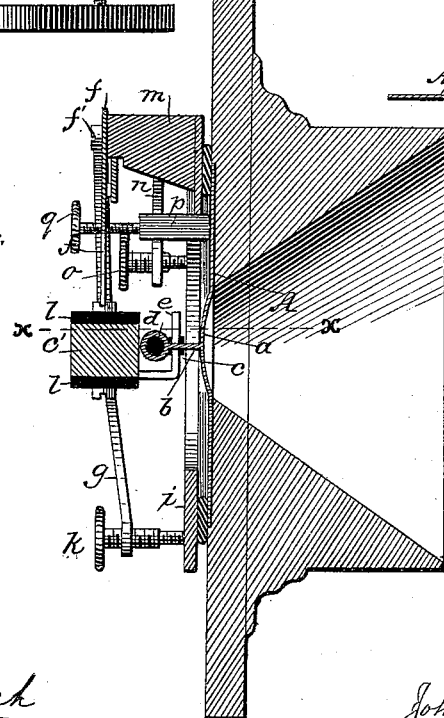
Fig. 2.
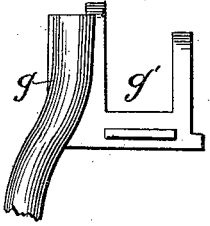
Fig. 4ª.
WITNESSES:
Fred G. Dieterich
Leon A. Kenion
INVENTOR:
John E. Dann
John Lapp
BY Munn & Co
ATTORNEYS.

(No Model.) 2 Sheets—Sheet 2.
J. E. DANN & J. LAPP.
TELEPHONE TRANSMITTER.
No. 347,924. Patented Aug. 24, 1886.
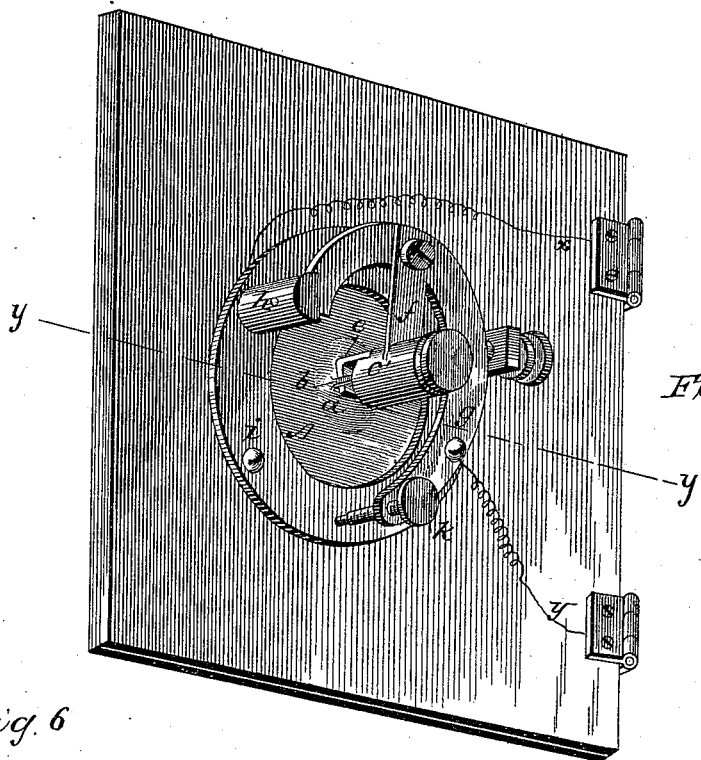
Fig. 5.
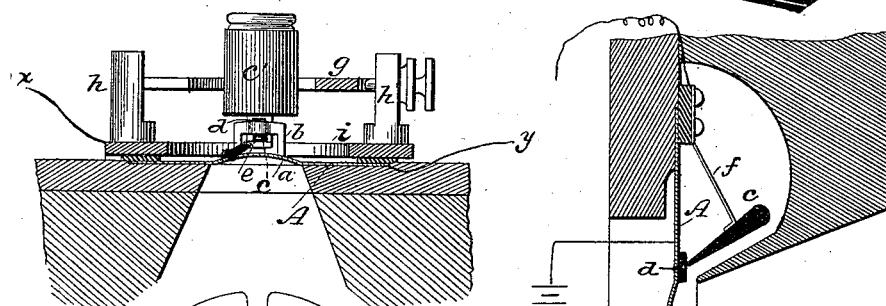
Fig. 6.
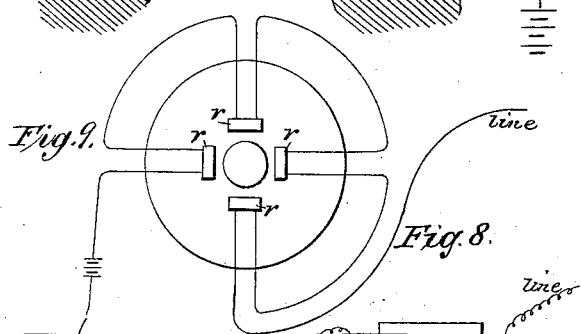
Fig. 9. Fig. 8.
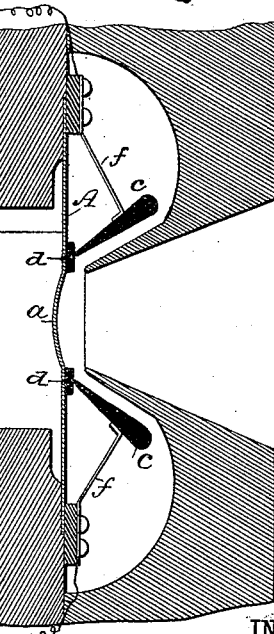
Fig. 7.
Fig. 10
WITNESSES:
Fred. G. Dieterich
Solon C. Kemon
INVENTOR:
John E. Dann
John Lapp
BY Munn & Co.
ATTORNEYS.
N. PETERS, Photo-Lithographer, Washington, D. C.

UNITED STATES PATENT OFFICE.

JOHN E. DANN AND JOHN LAPP, OF HONEOYE FALLS, NEW YORK.

TELEPHONE-TRANSMITTER.

SPECIFICATION forming part of Letters Patent No. 347,924, dated August 24, 1886.

Application filed March 22, 1886. Serial No. 196,201. (No model.)

*To all whom it may concern:*

Be it known that we, JOHN E. DANN and JOHN LAPP, of Honeoye Falls, in the county of Monroe and State of New York, have invented certain new and useful Improvements in Telephones, of which the following is a full, clear, and exact description.

The object of our invention is to provide an improvement in that class of telephonic transmitters having vibrating electrodes.

The construction and combination of parts and mode of operation are as hereinafter described and claimed.

In accompanying drawings, two sheets, Figure 1, Sheet I, is a perspective view of our preferred form of instrument. Fig. 2, Sheet I, is a vertical transverse section. Fig. 3, Sheet I, is an under side view of a portion of the instrument. Fig. 4, Sheet I, is a transverse section on line $xx$, Fig. 2. Fig. 4ª, Sheet I, is a detail plan view. Fig. 5, Sheet II, is a perspective view of a modified form of our instrument. Fig. 6, Sheet II, is a horizontal section on line $yy$, Fig. 5. Fig. 7, Sheet II, is a transverse central section of a transmitter, showing another modified arrangement of the electrodes and contact-points. Fig. 8, Sheet II, is a diagram showing a modified arrangement of the circuit of the instrument shown in Fig. 7 for the purpose of multiple transmission. Fig. 9, Sheet II, illustrates a modified circuit of the instrument shown in Fig. 7. Fig. 10, Sheet II, is a diagram illustrating another arrangement for multiple transmission.

We will first describe the instrument shown in Figs. 5 and 6, Sheet II, since it is simpler in construction than the one illustrated in Sheet I, and will therefore enable the latter to be more easily understood. Referring, then, to Figs. 5 and 6, the diaphragm A is shown with a conical central portion, $a$, which construction possesses marked advantages, and forms the subject of a claim in our prior patent, No. 338,660, granted March 23, 1886. The concave side of the cone $a$ is adjacent to the mouth-piece of the instrument, and to the point or opposite side of the cone is permanently secured a projecting arm or stirrup, $b$, whose outer end carries a carbon piece, $d$, that forms one of the electrodes. It is obvious that the electrode $d$ must move with the diaphragm. In other words, they will vibrate together corresponding to the mechanical impulses imparted by sound-waves. At each vibration the carbon $d$ is separated from the other electrode, $c$, which is also a piece of carbon fixed in the end of a bent metallic finger, $e$, attached to or forming part of a metal piece or block, which is fixed on the free end of a plate-spring, $f$. This block serves to weight the electrode $c$, so that its inertia is increased to that extent. The spring $f$ is secured to the short arm of a curved C-shaped lever, $g$, which is pivoted in posts $h$, fixed on the iron ring $i$, that holds the diaphragm in place. The other or longer arm of said lever is supported adjustably by a differential screw, $k$, that passes through its extremity and enters the ring $i$. The wires $xy$ are connected in the usual way with a battery, induction-coil, and the line. The ring $i$ is insulated from the diaphragm A by an interposed piece of rubber, and hence the circuit is completed through said ring $i$, the posts $h$, the spring $f$, the block, finger $e$, electrodes $c$ and $d$, and the diaphragm A, as will be readily understood by reference to Figs. 5 and 6, Sheet II.

We will now indicate certain details of construction and then the operation of the instrument. The carbon or electrode $d$ is held far enough from the apex of cone $a$ to allow space for the finger $e$ between them, and also to permit vibration of the same without contact of the finger $e$ with the cone. The spring $f$ has a moderate degree of stiffness, but will allow due vibration of the weighted piece and its attached finger $e$. It normally holds the carbon points $cd$ in light contact, and it is obvious this might be effected by gravity; but when a sound-wave strikes the diaphragm the latter moves inward and causes separation of the points. This separation is primarily due to the relatively greater inertia of the weight or piece $c'$, (of which the electrode-holder $e$ is an attachment,) which prevents it from following the movement of the diaphragm in the same instant of time. Nevertheless the weighted or block electrode $c$ is set in vibration, although slower than the diaphragm. It will be seen that the diaphragm vibrates entirely free—that is to say, it is unhindered by contact with and does not act against an electrode, (on its rear or inner side,) and which would necessarily move with it at the first impulse, as usual in other transmitters of this class. It will therefore obviously vibrate more easily and rapidly and in better accord with the impulses of the sound-waves. This feature is hence of much importance to the desired result.

The function of the pivoted lever $g$ and the screw $k$ is to enable the electrode $c$ to be adjusted with the nicety required to secure exactly the necessary relation of contact and pressure between the electrodes. The inner end of the screw $k$ is reduced, and has a finer thread than the other portion, which works through the lever. This construction enables a finer and more speedy adjustment to be made than would be practicable with a screw having a uniform diameter and thread.

We will now describe the instrument shown in Sheet I, Figs. 1, 2, 3, 4, 4ª. In this case we utilize more than one carbon contact-point. The block attached to the spring $f$ is made in two parts, $c'\ c'$, and each one provided with a finger, $e$, carrying a piece of carbon, $c$. The arm $b$, attached to the cone $a$, carries a bar of carbon, $d$, which is arranged parallel to the general plane of the diaphragm. The fingers $e$ are on opposite sides of said arm $b$, and hence their carbon points are normally in light contact with the opposite ends of the carbon bar $d$, as shown clearly in Fig. 4. The pieces $c'\ c'$ are insulated by and secured in a flanged holder, $l$, of hard rubber, which is in turn attached to the free end of the spring $f$. As shown by the arrangement of wires $x\ y$, the circuit is through one of the pieces $c'$, a finger $e$, and carbon bar $d$ to the other finger $e$ and piece $c'$; but it may, of course, be formed by attaching one of said wires to the diaphragm instead of a piece $c'$. Obviously, as in the instrument shown in Figs. 5 and 6, the vibration of the diaphragm causes separation of the carbon points $c\ d$. In this instrument we also employ a lever, $g$, and differential screw $k$ to adjust the spring $f$, and thereby obtain required relation of contact of the carbon points; but we prefer to pivot the lever at its upper end and provide it with an arm, $g'$, Figs. 1 and 4ª, that projects laterally beneath the spring $f$, and thus serves (when the screw $k$ is manipulated) to raise the latter to the extent required to bring the carbon points $c$ up against the bar $d$. The spring $f$ is secured by a screw, $f'$, to the metal block or piece $m$, and the lever $g$ has pivot or fulcrum points that enter sockets in said block. In consequence of the use of more than one contact-point $c$, we must provide for adjustment of the same, so that one will press on the bar-electrode $d$ with the same force as the other. We therefore so construct and arrange the block or spring-supporting piece $m$ that it may rock or tilt slightly, as will appear from inspection of Fig. 3. The base of said piece $m$ has a point or knife-edge that is set in transverse groove in the ring $i$, leaving a very narrow space between the latter and the flat portion of the base. To tilt or adjust the piece, and also hold it fixed in any adjustment, we employ the lever $n$ and a differential screw, $o$, similar to those used and previously described for adjusting the pressure of the spring $f$. This lever $n$ is rigidly connected with the spring-support $m$, and the screw $o$ passes through its free end and enters the ring $i$. By turning the screw the piece $m$ is tilted laterally one way or the other, and the electrodes $c\ c$ are consequently adjusted relatively to the bar $d$ so as to press equally thereon, as will be readily understood. To dampen the diaphragm we use a soft-rubber block, $p$, Fig. 2, and provide a screw, $q$, for regulating the degree of pressure. The screw works through the spring $f$, and the latter presses inward or toward the diaphragm with the required force. Within certain limits this same screw $q$ and rubber block $p$ may serve also as means for adjusting the pressure-contact between the electrodes $c\ d$.

In Fig. 7 we show a modified arrangement of the electrodes, but still preserving the same principle of freedom of vibration of the diaphragm, independent of pressure of an electrode against its inner side. In this case the electrodes $c$ are, as before, pieces of carbon held adjustably by springs $f$, that are fixed to the diaphragm-ring $i$, and their points rest lightly as possible on carbon blocks $d$, attached to the diaphragm at the base of the cone $a$. The circuit is through one electrode $c$ and contact-point $d$, then through the diaphragm and the other contact-point and electrode. The amplitude of vibration of the diaphragm of the receiving-instrument is directly related to air-resistance in the transmitter. By this arrangement the circuit is through the line, diaphragm, and electrodes, and when the diaphragm vibrates the latter lightly separate. By increasing the number of electrodes $c$ and isolated contact-points, it is obvious the number of such separations will be correspondingly increased, and thereby the amount of air-resistance to the current may be multiplied at pleasure.

In case a non-metallic or non-conducting diaphragm is used, we propose to attach carbon or metal plates $r$ thereto, as shown in Fig. 9, and to provide two electrodes for each; also, to arrange the circuit so that the current shall pass successively through one electrode, then a surface-plate, $r$, and next through the adjacent electrode, and so on through the others in the series. We may utilize this arrangement to form a multiple transmitter. For this purpose a wire will be run from the battery to each plate $r$ and a line-wire connect with each electrode, as shown in Fig. 10. Thus with four plates $r$ there will be four line-wires, and a message spoken into the instrument will be transmitted over the four lines simultaneously. On this principle all that is necessary to adapt the instrument shown in Figs. 1, 2, 3, 4 for double transmission is to connect each block or piece $c'$ with a separate line-wire, as shown in Fig. 9.

What we claim is—

1. The combination, with the diaphragm, a bracket or arm attached to it, and an electrode carried by said arm and thus held apart from the diaphragm, of a second electrode which projects between the other and the diaphragm, the weight attached to the second electrode, and a spring which supports the latter and tends to hold it normally in light contact with the electrode attached to the diaphragm, as shown and described.

2. The combination, with the diaphragm and electrode attached to it, of the adjusting-screw and the lever, arranged substantially as specified, whereby it is adapted to be moved independently of said spring and its lateral arm projecting beneath the spring and pressing upward against it, as shown and described, for the purpose specified.

3. The combination, with the diaphragm and an electrode, of a second electrode having two or more contact-points, a spring carrying the same, and a rocking support or device, to which the spring is attached, whereby the electrode having multiple contact-points may be adjusted to equalize the pressure of all its points on the other electrode, as shown and described.

4. The combination of the rocking support having a knife-edge bearing, the spring, the multiple-point electrode, the diaphragm, and a second electrode attached to it, as shown and described.

5. The combination of the lever, adjusting-screw, and rocking support with the spring and multiple-point electrode, the diaphragm, and the other electrode, as shown and described.

6. The combination, with the diaphragm and electrode held at a short distance from it, and attached to it by post or posts, and the larger or weighted electrode and the spring carrying the same, and lever and adjusting-screw, as shown and described, whereby the pressure of one electrode on the other may be regulated, as specified.

JOHN E. DANN.
JOHN LAPP.

Witnesses:
   AMOS W. HART,
   P. B. TURPIN.